United States Patent [19]
Gaulier

[11] 3,700,055
[45] Oct. 24, 1972

[54] THRESHOLD RESPONSIVE SCALE
[72] Inventor: Jean-Claude Gaulier, Bois D'Arcy, France
[73] Assignee: Compteurs-Schlumberger, Montrouge, France
[22] Filed: Feb. 10, 1972
[21] Appl. No.: 225,212

[30] Foreign Application Priority Data
Feb. 12, 1971 France.................7104781

[52] U.S. Cl. ..............177/204, 177/134, 177/144, 177/164, 177/202, 177/245, 177/230
[51] Int. Cl.......G01g 3/04, G01g 19/46, G01g 21/16
[58] Field of Search............177/50, 1, 164, 168–172, 177/175, 176, 202, 134, 135, 144, 203–206, 230, 253, 237, 225, 245, 248

[56] References Cited

UNITED STATES PATENTS

| 1,782,654 | 11/1930 | Jaenichen | 177/203 |
| 2,074,983 | 3/1937 | Flanagan | 177/202 |
| 2,146,727 | 2/1939 | Fleischer | 177/50 |
| 3,373,830 | 3/1968 | Thomson | 177/168 |
| 3,512,593 | 5/1970 | Edmondson | 177/245 |

FOREIGN PATENTS OR APPLICATIONS

| 1,145,802 | 5/1957 | France | 177/237 |
| 929,031 | 6/1955 | Germany | 177/1 |
| 528,239 | 10/1940 | Great Britain | 177/168 |
| 240,635 | 10/1946 | Switzerland | 177/168 |
| 352,841 | 4/1961 | Switzerland | 177/132 |

Primary Examiner—Robert S. Ward, Jr.
Attorney—William R. Sherman et al.

[57] ABSTRACT

According to an illustrative embodiment of the invention, a scale for passageway is described comprising a horizontal plate for mounting level to the floor of the passageway to receive loads moving therein. Means are provided to convert the vertical load on the plate into a force on a force transmitting member having a first and a second portion subjected by virtue of respective first and second prestressed springs to forces which resist displacement of these portions when a force is applied to the force transmitting member by the load converting means. The second spring is prestressed with a force greater than that of the first spring and the force transmitting member is mounted for tipping to allow the first portion to be displacing the second portion against the second spring. Means responsive to the displacements of the first and second portion are provided for detecting respective first and second load thresholds on the plate and adapted for coupling to control means of the passageway.

9 Claims, 3 Drawing Figures

PATENTED OCT 24 1972

THRESHOLD RESPONSIVE SCALE

This invention relates to threshold responsive scales, and particularly to scales designed for mounting in the floor of passageways for controlling moving loads passing therethrough, such as the passageways used for controlling the access of persons into a paying entrance enclosure.

Prior art passageways are known which include an access corridor, a gate at one end of the corridor to close it off, means for opening and closing the gate, and an electronic device for controlling the latter means. In so-called open or free passageways, as used in certain subway systems for example, the gate is normally open to allow the passage of users, and is closed if the entrance ticket presented is not valid or if there is any attempted fraud. Such a passageway is described in French Pat. No. 2.029.911 filed on Jan. 31, 1969 and granted on Oct. 12, 1970 to Compagnie des Compteurs.

In such installations, it may be desirable to further differentiate between the passage of adults and children, such as when the latter are admitted free of charge into the enclosure.

An object of the invention is to provide a load threshold responsive scale for a passageway for performing a differentiation among users of such passageway according to their weight.

Another object of the invention is to provide a threshold responsive scale embodying simple and accurate mechanical means.

A further object of the invention is to provide a scale responsive to a double threshold, particularly one which is adapted to automatically control free or open passageways.

According to the invention a threshold responsive scale, particularly suitable for use in a passageway comprises a horizontal plate for receiving a load, a rigid force transmitting member and means for converting a vertical load on the horizontal plate into a force on the force transmitting member. Means are provided for submitting the force transmitting member to two distinct forces to resist displacement of such member by the load converting means when a load is applied on the plate. Preferably, these two distinct forces are applied to first and second laterally spaced apart portions of the force transmitting member. These distinct forces are such that a greater force must be applied by these load converting means on this force transmitting member to displace the second portion of this member than to displace the first portion against the corresponding resisting forces. Depending on the forces applied by the load converting means, the first portion of the force transmitting member may thus be displaced while the second portion substantially remains in the same position. This may conveniently be obtained by properly mounting the force transmitting member relative to the force submitting means and to the load converting means to allow such member to tip slightly thus letting the first portion move without substantially displacing the other portion. The scale further includes means responsive to the displacement of the force transmitting member against at least one of the displacement resisting forces applied thereon for detecting and discriminating between loads on the plate above and below a threshold level. Advantageously these displacement responsive means are responsive to the displacement of the force transmitting member against one of the displacement resisting forces to detect a first threshold for the load on the plate and against the other displacement resisting force to detect a second threshold.

According to an important aspect of the invention such a threshold responsive scale is adapted for mounting in a pit in the floor of a load controlling passageway across which the plate extends and the displacement responsive means of the scale are adapted for coupling to logic circuitry controlling the operation of the passageway.

Further objects and aspects of the invention will become apparent from the following description of an illustrative embodiment, given with reference to the appended drawings in which.

Figure 1:
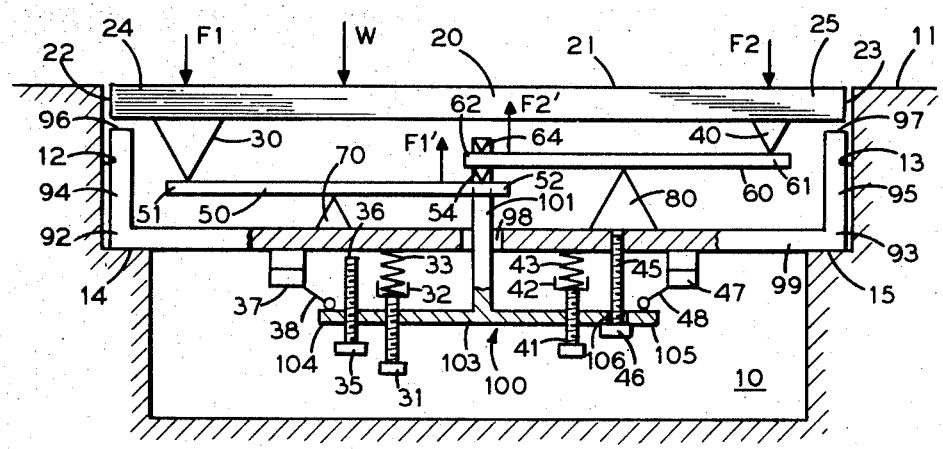
FIG. 1 is a partly sectional elevational schematic view of a double-threshold responsive scale embodying the principles of the invention.

Referring to FIG. 1, a scale is shown inside a pit 10 built in the ground. This scale includes a rigid load withstanding horizontal plate 20 having a top surface 21 at the level of the ground or floor 11 and lateral sides 22 and 23 facing the opposite side walls 12 and 13 at a short distance thereof. Underneath the plate 20 and toward its lateral ends 24 and 25 are secured two downwardly oriented knife edges 30 and 40 which provide two fulcrums through which the ends of the plate respectively rest on two levers 50 and 60. The tips of the knife edges 30 and 40 rest respectively at ends 51 and 61 of the levers 50 and 60, said levers being placed substantially horizontal at two distinct levels under the plate 20 and the knife edges 30 and 40 being sized to accommodate this difference of level while maintaining the surface 21 of the plate 20 horizontal. The ends 52 and 62 of the levers opposed to the ends 51 and 61 are both located directly under the middle section of the plate 20 in the vertical direction thereof, the end 62 being above the end 52.

The levers 50 and 60 are pivotally mounted on two knife edges 70 and 80 respectively providing fulcrums on which the centers of these levers rest. These knife edges are upwardly oriented and attached to the upper face of a horizontal fixed beam 90 forming the base of the scale, these knife edges also being of different sizes to support the levers 50 and 60 at their respective levels.

The beam 90 extends across the pit 10 between two shoulders 14 and 15 formed in the lateral sides of the pit and above a restricted lower portion 16 of this pit. The lateral ends 92 and 93 of the beam rest on the shoulders 14 and 15. Vertical rims 94 and 95 integral with the beam extend upwardly from the ends 92 and 93 along the lateral sides 12 and 13 of the pit 10. The tops 96 and 97 of these rims 94 and 95 are opposite the lower face of the plate 20 at a short distance thereof under the ends 24 and 25.

The support beam 90 has an opening 98 formed in the central portion thereof through which passes with a lateral clearance the upright leg portion 101 of a rigid inverted T shaped member 100. The upper end of the leg portion 101 is provided with two superposed knife edges 54 and 64 fixedly secured thereto. These knife edges 54 and 64 are turned downwardly and respectively rest on the ends 52 and 62 of the levers 50 and 60 to apply a downwardly directed force on these levers which counterbalances the load applied thereon by the knife edges 30 and 40 of the plate 20.

The member 100 has a bar portion 103 extending laterally below the beam 90. In the branch 104 of the bar 103 extending to the left of the leg portion 101 in FIG. 1 is mounted a vertical adjusting screw 31 having a cup 32 secured to its upward looking tip for receiving the lower end of a compression spring 33 the upper end of which bears against the lower face 99 of the beam 90. This screw 31 provides for adjusting the biasing force of the spring 33 against the branch 104. On this same branch 104 is mounted a parallel stop screw 35 having an upward looking tip 36 at an adjustable distance of the beam 90 when no load is applied on the plate 20. In the branch 105 of the bar 103 extending to the right of the leg portion 101 is mounted a vertical adjusting screw 41 having a top cup 42 receiving the lower end of a compression spring 43 the upper end of which bears on the beam 90 for adjusting the biasing force of such spring 43 against the branch 105. The latter spring 43 is prestressed with a force greater than that of the spring 33, both springs being equally laterally displaced on either side of the leg portion 101. A vertical screw 45 adjacent to screw 41 is screwed into the beam 90 and projects downwardly therefrom and passes through an opening 106 in the branch 105. The head 46 of the screw 45 is below the branch 105 and larger than the opening 106 so as to hold the branch 105 against downward movement under action of the spring 43 when the plate 20 is not loaded. The screw 45 slides freely through the opening 106 with sufficient lateral clearance to allow a slight lateral tipping movement of the member 100. Two electrical microswitches 37 and 47 are mounted under the beam 90 with their feeler means 38 and 48 in direct contact with the respective ends of the horizontal branches 104 and 105 of the bar 103 of the member 100.

In operation, when a load of weight $W$ is applied on the plate 20, represented by arrow $W$, the knife edges 30 and 40 respectively apply forces $f1$ and $f2$ where shown by arrows F1 and F2 on the levers 50 and 60. These two levers 50 and 60 thus transmit to the upright leg portion 101 of the member 100 respective equal forces $f'1$ and $f'2$ because of the centered arrangement of the fulcrums 70 and 80 of the levers (where shown by the arrows F'1 and F'2). The total force $W'$ applied to the leg portion 101 is:

$$W' = f'1 + f'2 = f1 + f2 = W$$

This force is transmitted by the member 100 to the prestressed springs 33 and 43 via the adjusting screws 31 and 41. Since these screws are equally spaced from the leg 101, the force applied on each spring 33 and 43 by the respective branches 104 and 105 is $W/2$. Now assume that the spring 33 is prestressed with a force of 2 kg, and the spring 43 with a force of 7.5 kg, for example.

If the weight W of a load on the plate 20 is between 4 and 15 kg, the spring 33 is further compressed by the branch 104 of the bar 103, since $W/2$ is greater than 2 kg, and the end of the branch 104 is displaced to actuate the microswitch 37. The upward travel of this branch 104 is limited by the abutment of the stop screw 35 against the beam 90, the travel distance being just sufficient to actuate the microswitch 37. During this movement, the spring 43 is not further compressed because it is prestressed with a force greater than that acting upon it, i.e., $W/2$ which is smaller than 7.5 kg. The member 100 tips over slightly owing to the lateral clearance provided between its upright leg portion 101 and the walls of the opening 98 as well as to the play provided for the screw 45 within the opening 106. Here the springs 33 and 43 are helical and their connection to the member 100 via the adjusting screws 31 and 41 allows for the slight tipping of this member 100 while the spring 33 is being further compressed. During this slight compressing displacement of the branch 104, the branch 105 downwardly biased by the spring 43 abuts against the head 46 of the screw 45 adjacent to the screw 41 and it may be seen that the branch 105 is slightly moved without being practically displaced against the spring 43.

When the weight of the load on the plate 20 is greater than 15 kg, the spring 31 is first compressed by displacement of the branch 104 and the microswitch 37 is actuated thereby to deliver a first signal. Then, the screw 35 abuts against the beam 90, and the spring 43 is in turn compressed above its preloading force, because $W/2$ is greater than 7.5 kg, thus causing the member 100 to tip over slightly about the upper tip of screw 35 and the end of branch 105 to actuate the microswitch 47.

The two microswitches 37 and 47 operate almost simultaneously when such a load greater than 15 kg is applied and such result may be obtained while the plate 20 is depressed by as little as 1 millimeter and has its ends 24 and 25 resting on the tops 96 and 97 of the rims 94 and 95. Thus, regardless of the value of $W$, all the elements of the scale, except for the plate 20 are never subjected to a force greater than 15 kg. Of course, the adjustment of the force of the springs 33 and 43 can be varied within broad limits by means of the screws 31 and 41, so that the values indicated above by way of example can be adapted to any desired situation.

Figure 2:
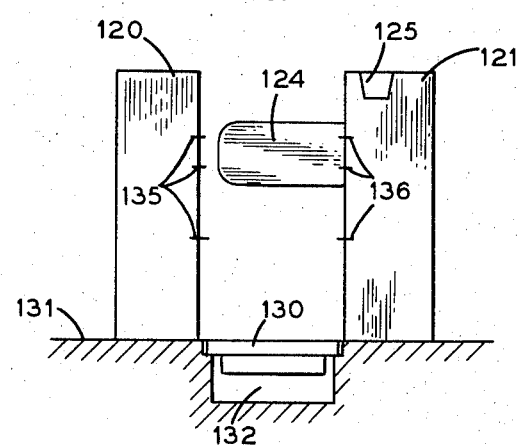
FIGS. 2 and 3 are schematic front and top views respectively of a free passageway equipped with scales such as represented in FIG. 1.
Figure 3:
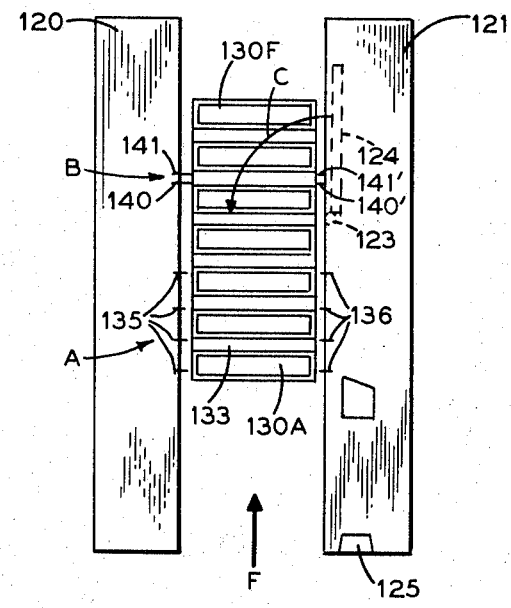

It can be seen that a scale is thus provided which is mechanically strong, simple and accurate and detects two thresholds for the loads moving on the plate with a very small displacement of the plate. This type of scale is particularly suitable for passageways as represented for example on FIGS. 2 and 3. Such passageway is laterally defined by two longitudinally extending walls 120 and 121 in which are housed various control devices such as a ticket reader and photoelectric cells with associated electro-luminescent diodes. The direction of passage in the passageway is represented by the arrow F, the ticket reader 125 being located at the entrance of such passageway, and a gate 124 is provided for closing it off toward the exit end thereof. Such gate 124 is hinged about a vertical axis 123 and is shown in closed position in FIG. 2 and in open position in FIG. 3, i.e., retracted along the side of the wall 123, the arrow C indicating the closing movement of the gate. As depicted by FIG. 3, a series of seven parallel scale plates 130A to F are mounted in the floor 131 of the passageway, such plates 130 extending transversely across the passageway. Each of these scales is constituted as described with reference to FIG. 1 and the seven scales are housed in a pit 132 built in the ground of the passageway, the plates being separated by fixed lid plates 133.

Following the entrance of the passageway where the ticket reader 125 is located, a zone designated by A, (see FIG. 3), is provided in said passageway which is covered by a series of photo-cells schematically shown at 135 in the inwardly looking face of wall 120 with corresponding electro luminescent diodes in the opposite wall 121. As shown by FIG. 2, series of photo-cells 135 are arranged at different levels within the wall 120. These photo-cells cover the passage of persons passing along the passageway to detect possible fraud attempts such as by a person without proper ticket attempting to hide behind another person regularly admitted therein. Next to the zone A is a zone B wherein the gate 124 is located and wherein adjacent photo-cells such as 140 and 141 with corresponding electro-luminescent diodes 140' and 141' are mounted for counting the persons passing by the gate 124, both cells 140 and 141 being simultaneously energized by the passage of one person to produce one count. Moreover, when a person enters the passageway in the direction F, his movement is followed by the successive operation of the load detecting means actuated by the respective plates 130 depressed by the person.

If the person is a child below age 4 i.e., weighing, generally less than 15 kg) a logic circuitry, not shown, controlling the passageway is informed by the presence of a signal delivered by the first threshold microswitch of a scale 130 in the absence of a signal from the second threshold microswitch of that scale. In this case, this logic is such that the cells do not "see" the child, and in particular, in zone B, no counting takes place if an adult, having normally introduced his ticket in the reader 125, follows the child. Thus, the child is admitted free of charge. Moreover, if a person behind a child fails to insert a ticket in the reader, the order to close the gate arm 124 is delayed as the long as the child has not cleared the zone B. The connections between the microswitches such as 37 and 47 in FIG. 1 and of the logic circuitry are not shown. Their design is known to those skilled in the art and does not form an integral part of the invention.

While a specific embodiment of the invention has been shown and described, it will be understood by those skilled in the art that certain modifications and variations both in the form and detail can be made without departing from the basic concepts of the invention.

What is claimed is:

1. A threshold responsive scale for a human passageway comprising:
   a horizontal plate for receiving a load;
   a movable rigid force transmitting member;
   means for converting a vertical load on said horizontal plate into a force acting on said force transmitting member;
   first and second means for biasing corresponding first and second laterally spaced apart portions of said force transmitting member against such acting force to require a greater acting force for displacing said second portion against said second biasing means by a prescribed amount than said first portion against said first biasing means by the same amount, said first portion being movable against said first biasing means without substantially displacing said second portion against said second biasing means; and
   means responsive to the respective displacements of said first and second portions of said force transmitting member for detecting and discriminating between loads on said plate above and below a predetermined threshold.

2. The scale of claim 1 further including abutment means for holding said first portion against further displacement upon actuation of said displacement responsive means thereby, and wherein said force transmitting member is mounted for tipping about said abutment means to displace said second portion against said second biasing means upon application of a load greater than the predetermined threshold on said plate.

3. The scale of claim 1 further including means for preloading said first biasing means to require the application of a minimum acting force on said force transmitting member for initiating displacement of said first portion against said first biasing means and means for preloading said second biasing means to require an acting force greater than this minimum force for initiating displacement of said second portion against said second biasing means, whereby said displacement responsive means can detect first and second threshold loads on said plate corresponding to prescribed displacements of said first and second portion respectively against said first and second biasing means.

4. The scale of claim 3 further including first abutment means for holding said first portion against further displacement upon detection of a load greater than the first threshold by said displacement responsive means, and second abutment means for directly holding said plate against further downward displacement upon detection of a load greater than the second threshold by said displacement responsive means.

5. The scale of claim 3 further including abutment means adjacent to said second portion of said force transmitting member for holding said force transmitting member against at least one of said biasing means when the load on said plate is smaller than the first threshold.

6. The scale of claim 1 further including a base under said plate adapted for mounting in a pit in a position where the surface of said plate is substantially level with the floor of a passageway, said base having lateral upright portions, the top face of which provides a downward stop for the lower face of said plate.

7. The scale of claim 1 further including a base under said plate supporting said load converting means and adapted for mounting in a pit above a lower portion of the pit in a position where the surface of said plate is substantially level with the floor of a passageway and wherein said load converting means are coupled to a third portion of said force transmitting member arranged substantially in the vertical direction of the middle section of said plate above said base while said first and second portions are located below said base, and said first and second biasing means are mounted between said base and said first and second portions under said base.

8. A scale for a human passageway comprising:

a rigid horizontal plate for mounting across the floor of a passageway;

at least two lever means below said plate for pivotally supporting said plate;

first fulcrum means for pivotally coupling each of said lever means to a corresponding portion of said plate to support said plate;

a base below said plate;

second fulcrum means for pivotally coupling said lever means to said base, said base being adapted for mounting in a pit in a passageway in a position where said plate is substantially level with the floor of the passageway;

a movable rigid force transmitting member;

means above said base for coupling said force transmitting member to said lever means to share a counterbalancing force transmitted by said force transmitting member between said lever means to counterbalance a load force applied by said plate to said lever means;

first and second resilient means for respectively biasing first and second laterally spaced apart portions of said force transmitting member under said base with corresponding first and second forces to resist respective displacements of said first and second portions upon application of a force on said force transmitting member by said lever means;

said force transmitting member being mounted for tipping to allow said first portion to move against said first resilient means without substantially displacing said second portion against said second resilient means;

first and second means for prestressing said first and second resilient means respectively to require the application of a greater force on said force transmitting member by said lever means for initiating displacement of said second portion against said second resilient means than for initiating displacement of said first portion against said first resilient means;

means responsive to the displacement of said first portion of said force transmitting member for detecting a first threshold load on said plate; and means responsive to the displacement of said second portion of said force transmitting member for detecting a second threshold load on said plate.

9. A passageway for discriminating between users according to their weight comprising:

a floor;

two lateral boundaries defining a passage along said floor;

a pit in the floor between said boundaries;

a plurality of scales having respective parallel rigid load plates extending across said passage along said floor, at least one of said scales including in addition to its respective plate:

a movable rigid force transmitting member;

means for converting a vertical load on said respective plate into a force acting on said force transmitting member;

a base below said respective plate for supporting said load converting means, said base being mounted in the pit in a position where said respective plate is substantially level with said floor;

first and second means for respectively biasing said force transmitting member against such force acting thereon to require a greater acting force for initiating displacement of said member against said second biasing means than for initiating displacement of said member against said first biasing means; and means responsive to respective displacements of said force transmitting member against said first and second biasing means for detecting respective first and second threshold levels for the load on said respective plate, to discriminate between loads moving along said passage along said floor.

* * * * *

UNITED STATES PATENT OFFICE
CERTIFICATE OF CORRECTION

Patent No. 3,700,055   Dated   October 24, 1972

Inventor(s) Jean-Claude Gaulier

It is certified that error appears in the above-identified patent and that said Letters Patent are hereby corrected as shown below:

In the Abstract:

Line 14, after "to be" insert -- displaced against the first spring without substantially -- .

Signed and sealed this 29th day of May 1973.

(SEAL)
Attest:

EDWARD M. FLETCHER, JR.
Attesting Officer

ROBERT GOTTSCHALK
Commissioner of Patents